Jan. 2, 1968          H. A. PACE          3,361,698

COMPOSITION USEFUL AS SEALANT FOR PNEUMATIC TIRES

Filed Sept. 9, 1963

INVENTOR.
HENRY A. PACE

BY

J. B. Holden
ATTORNEY

United States Patent Office 3,361,698
Patented Jan. 2, 1968

3,361,698
COMPOSITION USEFUL AS SEALANT FOR
PNEUMATIC TIRES
Henry A. Pace, Akron, Ohio, assignor to The Goodyear Tire & Rubber Company, Akron, Ohio, a corporation of Ohio
Filed Sept. 9, 1963, Ser. No. 307,556
1 Claim. (Cl. 260—30.8)

This invention relates to a sealant composition for use in pneumatic tires which contain an air-retaining liner forming an integral part of said pneumatic tire.

The principal object of the invention is to provide a sealant composition which may be applied to the inside of a pneumatic tire to form an air-retaining barrier or to cooperate with an integral air-retaining liner to seal a hole formed in said liner by a piercing object, for example, a nail or a thorn.

Figure 1:
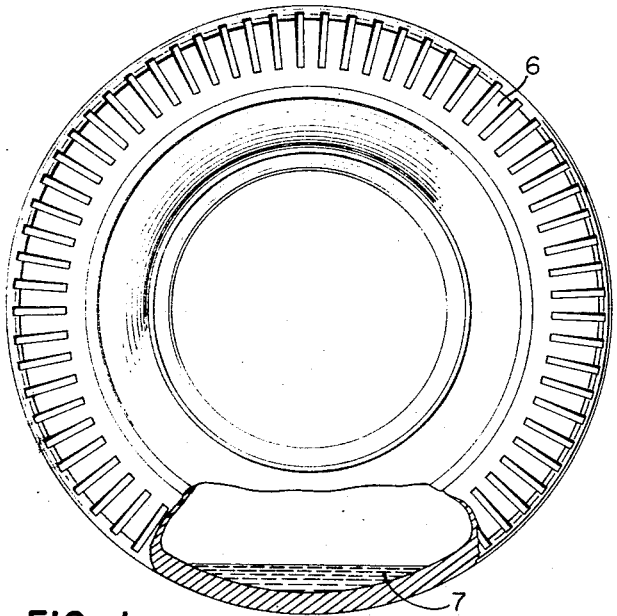
Figure 4:
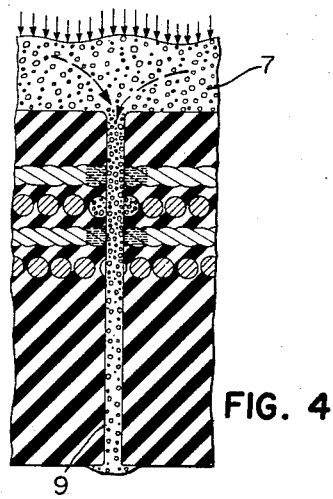
Figure 2:
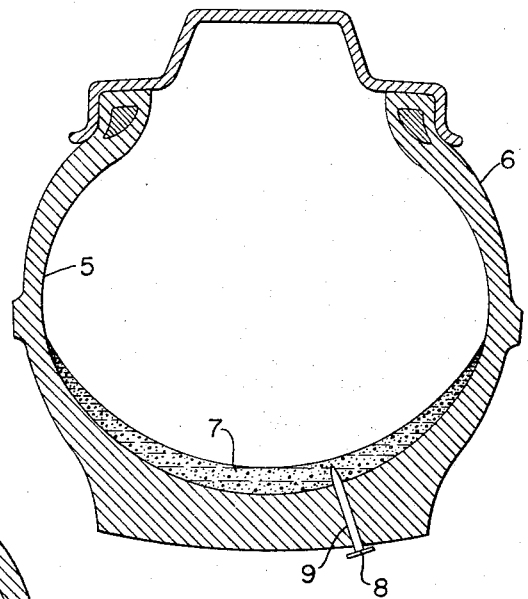
Figure 3:
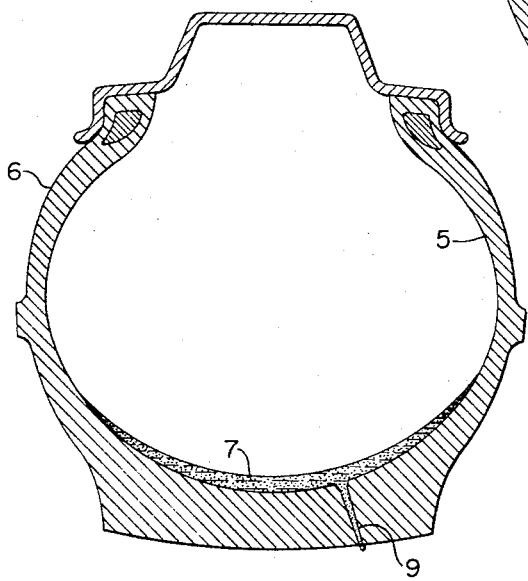

Further objects and advantages of the invention will be made manifest in the following detailed description which is intended to be read with reference to the accompanying drawing wherein FIG. 1 is a circumferential view of a pneumatic tire in a static condition with a partial section showing the liquid sealant in accordance with the invention where the tire is mounted on a wheel. FIG. 2 is a fragmentary perspective view on a larger scale of the tire of FIG. 1 in a dynamic condition showing a piercing object extending through the tire. FIG. 3 is a view similar to FIG. 2 but on an enlarged scale with the piercing object removed showing some of the sealant in operating condition within the puncture. FIG. 4 is an enlargement of the cross sectional view of FIG. 2 taken along the lines 3—3.

The sealant composition of the invention comprises a polyureaurethane elastomer and a sufficient amount of a solvent to dissolve the polyureaurethane elastomer and form a flowable mixture over a wide temperature range of about 100° C. to at least about 0° C. and preferably as low as −30° C. This sealant composition may be painted on the inside 5 of the pneumatic tire 6 to reduce the permeability of the pneumatic tire carcass to air and thus enhance the ability of the pneumatic tire to retain its inflation. Usually not only is the inside wall of the pneumatic tire painted with a sealant composition but a sufficient amount of the liquid sealant is added to form a pool 7 at least about one-eighth to about one inch deep in the tire while in the static condition as best seen in FIG. 1. Thus, when the tire is moving in the dynamic condition as shown in FIG. 2 and a sharp object such as a nail 8 or thorn penetrates the tire the fluid sealant will be forced out of the hole 9 by the air pressure. As the liquid sealant under air pressure flows out of the hole, the polyureaurethane elastomeric material will be trapped, sealing the puncture and thereby stopping the loss or leakage of air.

Where the liquid sealant compound contains an inert mineral filler having a particle size such that the mineral filler will pass through a 100 U.S. Standard Mesh screen and preferably a 200 mesh screen, this inert filler material acts as a physical block to slow down the loss of air and facilitates the polyureaurethane solution in bridging and closing the hole. Normally the amount of inert filler will vary from a low of about one-half to 10 parts per 100 parts of polyureaurethane elastomer with the preferred range being about 1 to about 7 parts.

Where an inert mineral filler is used, usually the amount of solvent utilized in dissolving the polyureaurethane elastomer will need to be increased for it is desirable that the viscosity of the liquid sealant composition be about 1000 to 10,000 centipoises as measured on the Brookfield viscosimeter (#3 rotor) at 25° C., with the preferred viscosities being about 2500 to 5000. Where the sealant composition does not contain any inert mineral filler it is desirable that the viscosity of the sealant composition be as high as possible, i.e., in excess of 5000 to 7500 and even 15,000 in some cases if it is fluid within the range of temperature to which the sealant composition in the tire will be subjected, that is, usually in the range of about −20° C. or some lower, to around 100° C. or slightly higher.

The inert filler materials useful in this invention are the diatomaceous earths, clays and related fillers which are essentially insoluble in the recommended solvents but have the ability to absorb about 0.5 to 3 grams of water per gram and yet still remain essentially non-pasty.

In a preferred embodiment of this invention at least all or part of the inert mineral filler is added to the sealant composition in admixture with a dry free-flowing rubber as the rubber has the added advantage of adhering the mineral particles together and effecting blockage of the puncture opening. Specific examples of the free-flowing mixtures of mineral powder and rubber are the well known commercial materials "Rubarite" and "Pliopave." These materials are prepared by mixing a rubbery latex with a water slurry of a mineral filler coagulating the slurry and filtering off the coagulum and drying the coagulum to obtain a free-flowing powder. Normally the amount of rubber deposited on the mineral filler will vary from about 20% to a high of about 80% depending on the method of preparation. Also, it should be appreciated that instead of the mineral fillers the essential carbonaceous materials such as finely divided coal or coal fines, asphaltene or the hard native asphalts may be used to replace all or part of the usual mineral filler. Normally it is preferred to use about a half to about ten parts of the powdery mixture of mineral filler and rubber hydrocarbons where the rubber hydrocarbons may be any of those commercially available such as butadiene-styrene copolymers, polybutadiene, polyisoprene, acryonitrile-butadiene copolymers, or any elastomeric material capable of being produced as a fine pulverulent material and which does not swell or dissolve in the above mentioned solvents.

The polyureaurethanes useful in this invention are prepared by the reaction of the following ingredients: the linear polyesters prepared from dihydric alcohols and dicarboxylic acids and having molecular weights ranging from about 1700 to about 2100, water in the amount of from about 2.5 to 4.0 mols per mol of polyester and diisocyanate selected from the group consisting of 2,4-tolylene diisocyanate and mixtures of 2,4 and 2,6 tolylene diisocyanate, the 2,6 isomer being present to an extent of not more than about 10% of the total diisocyanate in the mixture, the total diisocyanate being present in an amount of at least 80 mol percent of the equivalent amount (the amount theoretically required to react with the "reactive groups" present in the polyester and the water, said reaction being carried out in the presence of the catalyst system comprising a mixture of (a) N-methylmorpholine and (b) a condensation product of 1 mol of aniline and 4 mols of n-butyraldehyde, each in an amount ranging from about 0.25 to 3.0 parts by weight per 100 parts of polyester, the total catalyst employed ranging from about 0.5 to not more than 3.25 parts by weight per 100 parts of polyester employed.

More particularly, the liquid reaction mixture of polyester, water, diisocyanate and catalyst is allowed to foam and the foam is destroyed while it is in a fluid, unstable state thereby converting the liquid reaction mixture to a pulverulent, solid, non-cellular elastomer. This is accomplished by means of a shearing action exerted upon the foaming liquid reaction mixture facilitating the release of carbon dioxide by destroying the cellular structure. The resulting elastomer is then heated at a time and temperature ranging from 1 hour at 100° C. to about 8 hours at 125° C. to effect the cure.

The term "reactive group" as employed in this application is meant to include both hydroxyl and carboxyl groups present in the substance described (usually the polyester and water).

While it is possible to employ mixtures of 2,4 and 2,6-tolylene diisocyanates wherein the 2,6 isomer may approach approximately 20% by weight of the total diisocyanate, it is preferred that no more than 10% of the 2,6 isomer be employed. The 2,6 isomer when it is employed in this invention at more than 10% by weight of the total tolylene diisocyanate tends to cause the resulting polyureaurethane to be only partially soluble. These partially soluble polyureaurethanes, while they are still useful in certain instances for my purpose, may be subjected to the extra step of filtration when employed as a solution. It is also possible to prepare these soluble, fully cured elastomers by employing only one of the catalysts mentioned above, that is, one may employ either N-methylmorpholine alone or the condensation product of 1 mol of aniline and 4 mols of n-butyraldehyde alone in amounts ranging up to 3 parts per 100 parts of polyester, however, it is preferred to employ a mixture of the two catalysts in amounts up to 3.25 parts by weight. The polyureaurethane that is formed when only one catalyst is employed does not exhibit the most desirable properties. For instance, if the condensation product of 1 mol of aniline and 4 mols of n-butyraldehyde is the only catalyst employed in this reaction the resulting product tends to become sticky and has very high elongation and, if N-methylmorpholine is employed as the only catalyst, the resulting product tends to become much less soluble. It is believed this difference is due at least in part to the different functions which each of these catalytic materials performs. While the exact nature of each of these catalysts is not completely understood, it is believed that N-methylmorpholine tends to catalyze the formation of crosslinks in the reaction product of polyester, diisocyanate and water while the condensation product of 1 mol of aniline and 4 mols of n-butyraldehyde tends to catalyze the extension of this reaction to form somewhat linear polymers with very few crosslinks.

The polyesters useful in the practice of this invention are prepared by the condensation reaction between one or more glycols and one or more dibasic carboxylic acids. Normally the ratio of glycol to dibasic acid should be controlled so that there is an excess of glycol employed. This is done in order to obtain linear polyester chains containing a preponderance of terminal hydroxyl groups. Any glycol can be used in the preparation of these polyesters. Representative examples are ethylene glycol; propylene glycol; 2,3-, 1,3-, and 1,4-butylene glycols; 2-methyl pentanediol-2,4; 2-ethyl hexanediol; 1,3-hexamethylene glycol; diethylene glycol; triethylene glycol and the polypropylene glycols. Any dibasic carboxylic acid can be used in the preparation of these polyesters. Representative examples are adipic, sebacic, malonic, suberic, succinic, maleic, fumaric and itaconic acids. The preferred polyesters are those prepared by reacting adipic acid with ethylene glycol, propylene glycol, diethylene glycol and/or the butylene glycols, the glycols being used singly or in mixtures of two or more, to give polyesters having a molecular weight ranging from about 1700 to about 2100. These polyesters should have hydroxyl numbers of from about 70 to 52 and acid numbers of less than 2, thereby exhibiting a preponderance of terminal hydroxyl groups.

The water used in the practice of this invention is considered to be a bifunctional crosslinking agent by virtue of the intermediate amines which are formed. The amount of water employed must range from 2.5 mols to 4.0 mols per mol of polyester used. If a lower amount of water is used, the finished product will be a soft, somewhat gummy, insufficiently cured elastomer and will not exhibit satisfactory physical properties. If more than 4.0 mols of water are used the elastomer formed will be a hard, highly crosslinked, less soluble product and again will not exhibit the optimum physical properties. Best results have been obtained when approximately 3.0 mols of water per mol of polyester are employed in the practice of this invention.

The tolylene diisocyanates useful in the practice of this invention are 2,4-tolylene diisocyanate and mixtures of 2,6-tolylene diisocyanate and 2,4-tolylene diisocyanate wherein the 2,6-isomer is limited to not more than 10% by weight of the mixture. If more than 10% by weight of the 2,6-isomer is used the resulting elastomer will tend to become insoluble and therefore tend to become an undesirable product. The preferred tolylene diisocyanate is 2,4-tolylene diisocyanate alone or in mixture with not more than 5% by weight of the 2,6-isomer.

The amount of tolylene diisocyanate employed in this invention is at least 80 mol percent of the amount theoretically required to react with all of the hydroxyl and carboxyl groups (reactive groups) present in the polyester and the water. While more than the theoretical amount may be employed, any amount in excess of the theoretical amount of isocyanate groups required to react with the "reactive groups" of the polyester and the water produces no further substantial improvement in the finished product to warrant the added cost of this excess amount of diisocyanate. Therefore, in practice, it is preferred to use from 80 to 100 mol percent of the theoretical amount. Any amount of diisocyanate which contains more than a 20% deficiency of isocyanate groups theoretically required to effect complete reaction with the "reactive groups," i.e. the hydroxyl and carboxyl groups, of the polyester and the water will produce a finished product which is too soft and gummy to exhibit satisfactory physical properties. The most preferred amount of tolylene diisocyanate in the practice of this invention is about 10% less than the number of isocyanate groups theoretically required to react with the hydroxyl and carboxyl groups ("reactive groups") of the polyester and the water or about 90 mol percent of the theoretical amount.

It is contemplated, in the scope of this invention, to include the formation of the polymers by means of a "prepolymer" preparation. To form a "prepolymer" from an active-hydrogen-containing polymeric material, such as a polyester, and a diisocyanate, one has only to add to the polyester an amount of diisocyanate calculated to react with the hydroxyl and carboxyl groups or "reactive groups" present in the polyester, taking care to exclude any moisture from the mixture. The formation of a "prepolymer" is, in effect, the extension of the polymeric chain to give long chain polymers consisting of an ordered polymer of alternate units of polyester nuclei and isocyanate nuclei connected by a urethane linkage.

The catalyst normally employed in the practice of this invention consists of a mixture of N-methyl morpholine and the condensation product of 1 mol of aniline and 4 mols of n-butyraldehyde. It is preferred to employ at least about 0.25 to about 3.0 parts by weight of each to obtain satisfactory products. However, due to the exothermic nature of the reaction it is also preferred to employ these two catalysts in amounts where they are in an amount totaling 3.25 parts by weight per 100 parts of polyester.

Thus, it is suggested that one catalyst be employed in ranges from 0.25 to 3.0 while the other be employed in ranges from 3.0 to 0.25 parts by weight per 100 parts of polyester. The condensation product of one mol of aniline and four mols of n-butyraldehyde is further described in U.S. Patents 1,780,326 and 1,780,334. Best results have been obtained with these catalysts in amounts of 0.7 part by weight of the condensation product of aniline and n-butyraldehyde and 0.5 part by weight of N-methyl morpholine per 100 parts by weight of polyester used.

Small amounts of material having more than two functional groups per molecule, such as castor oil or other tribasic compounds may be incorporated into the polyester used in the practice of this invention without adversely affecting the solubility, yet enhancing physical properties, particularly the tensile strength. Thus, it has been found that up to about 3 parts by weight of castor oil or other trihydric compounds may be added per 100 parts by weight of polyester used. This absence of effect upon the solubility of the cured elastomers when polyfunctional material is added is not fully understood, since one would be led to believe that a material having a functionality greater than two would tend to cause a greater amount of crosslinks to form and it would be likely that such a polymer would be insoluble.

In the preparation of the cured polymeric elastomers of this invention, it is desirable to make use of a sigma-blade type of internal mixer. One such mixer that has been found very effective is a Baker-Perkins mixer which has two counter rotating sigma-type blades that exert a high shearing action upon the material. The following procedure is recommended. The polyester is added to the mixer first; the required amount of tolylene diisocyanate is added to the polyester, one of the catalysts is added and mixed in and then the water followed by the second catalyst is added to this mixture, at which time the mixture begins to foam. This foam is destroyed by the shearing action of the sigma-type blades. The mixing is continued until a solid semi-cured elastomer has been formed, which has been reduced by the action of the rotating blades to very small lumps or even powder. These discrete particles or crumbs are easily removed from the mixer and are heated in an oven for approximately 1 hour at 100° C. to about 8 hours at 125° C. to complete the cure.

Solvents which have been found to be particularly useful for forming solutions of these cured polyureaurethane elastomers are dimethylformamide, dimethylacetamide and dimethylpropionamide and dimethylsulfoxide, or mixtures of these solvents. The preferred mixture of dimethyl sulfoxide with dimethylformamide or dimethylacetamide are those having a freezing point of at least about −30° C. Whenever any of the first three mentioned solvents are used, a dissolution agent must also be used in the amount of from 0.1 to 1 percent by weight, based on the solvent. The most effective dissolution agent useful for this purpose is di-n-butylamine. However, it has been found that, when dimethyl sulfoxide is used as a solvent, it possesses a solvent power so great that no dissolution agent is necessary. It has also been found that if the products of this invention are dissolved in aforementioned solvents and cast into structures no further dissolution agent is required to be present in the solvent to re-dissolve this once cast product.

In forming the solutions of this invention, no special technique is required. Any method of preparing solutions of elastomers may be employed according to well-known practices. It is preferred, however, to use the pulverulent elastomers for this purpose. The solvent-elastomer mixture may also be heated to decrease the time required to prepare these solutions. In general, solutions up to 50% by weight solids content of elastomer in solvent can be prepared, with the solutions becoming more viscous as the solids content is increased.

Further details of the practice of this invention are set forth in the following examples which are to be interpreted as representative rather than restrictive of the scope of this invention.

Example A

Into a suitable container was placed 900 grams of a polyester prepared from the condensation of approximately 1.1 mols of a mixed glycol of ethylene glycol, diethylene glycol, and butanediol-1,4 in equal molar quantities with approximately 1.0 mol of adipic acid. This polyester had an hydroxyl number of approximately 60 and an acid number of approximately 1 (resulting in a "reactive number" of 61) and a molecular weight of approximately 1800. To this polyester were added 92.7 grams of a mixture of 98 parts by weight of 2,4-tolylene diisocyanate and 2 parts by weight of 2,6-tolylene diisocyanate. This mixture was stirred for 36 minutes while being maintained at a temperature ranging from 60° C. to 63° C. (This partially diisocyanate-modified polyester is called a prepolymer.) To this prepolymer were added 222 grams of a mixture of 98 parts by weight of 2,4-tolylene diisocyanate and 2 parts by weight of 2,6-tolylene diisocyanate, and 13.5 grams of castor oil. The mixture was then transferred to a 2-quart Baker-Perkins sigma-blade mixer and 6.3 grams of catalyst (the condensation product of 1 mol of aniline and 4 mols of n-butyraldehyde) were added. After mixing for 4 minutes, 27.3 grams of water were added at which time the mixture began to foam, this foam was destroyed by the shearing action of the sigma-blades. Some 3 minutes after the addition of the water, 5 cubic centimeters of N-methylmorpholine (another catalyst) were added. After this mixture had been allowed to mix for a period of approximately 20 minutes in the Baker-Perkins mixer, the formation of elastomer was observed. The mixing was continued for an additional 30-minute period, during which time the elastomer was reduced to powdered form. This was done to allow ease of handling and removal of the elastomer from the mixer. This powdered elastomer was heated in a 100° C. oven for 60 minutes to complete the cure.

Example B

The procedure described in Example A was duplicated except that no castor oil was added to the polyester.

Example C

A mixture consisting of (A) 750 grams of a polyester resulting from the condensation of adipic acid with a mixture containing equimolar quantities of ethylene glycol, diethylene glycol and butanediol-1,4 and having a hydroxyl number of approximately 60, an acid number of approximately 1 and a molecular weight of approximately 1800, and (B) 259 grams of tolylene diisocyanate (98% of the 2,4-isomer and 2% of the 2,6-isomer) was placed in a Baker-Perkins mixer. To this mixture were added 11.2 grams of castor oil. After stirring for approximately 1 minute, 5.3 grams of catalyst (the condensation product of one mol of aniline and four mols of n-butyraldehyde) were added to the mixture. Three minutes later 22.7 grams of water were added, at which time the mixture foamed. The foam was destroyed by the shearing action of the sigma blades. After a short interval (approximately three minutes), 4.1 cubic centimeters of N-methylmorpholine were added. The foaming continued but was constantly suppressed by the action of the sigma blades. The maximum exothermic temperature reached during this reaction was 90° C. Twenty-four minutes after the reaction started the elastomer began to form, the mixing being continued to reduce the elastomer to a powder form. This powdered elastomer was placed in a 100° C. oven for 1 hour to complete the cure.

Example D

The procedure described in Example A was repeated except that the polyester was a condensation product of approximately 1.1 mols of an 80/20 molar ratio of ethylene glycol/propylene glycol with approximately 1.0 mol of adipic acid. This polyester had an hydroxyl number of approximately 58 and an acid number of less than 1 and a molecular weight of approximately 1900.

While the following three examples are not illustrative of the preferred practice of this invention, they are included to illustrate that the resulting elastomers are only partially soluble in dimethylformamide if the 2,6-isomer content of the mixed tolylene diisocyanate used in the preparation of these elastomers is more than 10% by weight of the total mixture of diisocyanate and completely insoluble if more than 20% of the 2,6-isomer is employed.

*Example E*

The same procedure was used as in Example A, except that the tolylene diisocyanate was a mixture of 80% of the 2,4-isomer and 20% of the 2,6-isomer, by weight.

*Example F*

The same procedure was used as in Example E except that, instead of 13.5 grams, only 6.8 grams of castor oil were added to the polyester.

*Example G*

The same procedure was used as in Example A except that the tolylene diisocyanate used was a mixture of 48% of the 2,4-isomer and 52% of the 2,6-isomer, by weight.

The following two experiments, while they do not illustrate the preferred practice of this invention, illustrate that polymer or elastomer may be formed using only one of the aforementioned catalysts.

*Example H*

The procedure according to Example B was performed except that the N-methylmorpholine was eliminated from the reaction mixture. This resulted in a product having low tensile strength, i.e. 1537 p.s.i.

*Example I*

The procedure according to Example B was repeated except that the condensation product of 1 mol of aniline with 4 mols of n-butyraldehyde was eliminated. This resulted in a product which was rather difficult to dissolve.

The following example illustrates a somewhat larger scale practice of this invention.

*Example J*

To a 50-gallon Baker-Perkins mixer, equipped with two counter-rotating sigma blades and a cooling water jacket, was added 60 pounds of a linear polyester prepared from the condensation of approximately 1.1 mols of a mixed glycol of ethylene glycol, diethylene glycol and butanediol-1,4 in equal molar quantities with approximately 1.0 mol of adipic acid (having a hydroxyl number of approximately 60 and an acid number of approximately 2, resulting in a "reactive number" of approximately 62). The mixer was started and 0.94 pound of castor oil and 21 pounds of 100% 2,4-tolylene diisocyanate were added (if pigments such as extenders or coloring agents are to be employed they may be added at this time). About 3 minutes were allowed to effect a uniform solution after which 0.437 pound of catalyst comprising a condensation product of 1 mol of aniline and 4 mols of n-butyraldehyde was added and the mixture allowed to continue stirring for approximately 3 minutes. Then to this mixture was added 1.89 pounds of water at which time some foaming was detected. After approximately 3 or 4 minutes, 0.318 pound of the other catalyst, N-methylmorpholine, was added. During the first minute after the addition of the second catalyst vigorous foaming was observed which then subsided and the reaction mixture became more and more viscous. After several minutes it was observed that the mixture had been transformed from a viscous liquid to a soft solid mass. Seventeen minutes after the addition of the N-methylmorpholine the mass began to crumble, as it was now converted to a solid elastomer. The solid elastomer was allowed to remain in the mixer 14 minutes to complete its conversion to crumb form. This material was cured at 125° C. in a hot air oven for varying lengths of time, each sample of which was formed into a 33⅓% solution in dimethylformamide containing about 1.0% of di-n-butylamine.

The following example illustrates the preparation of the sealant compounds and their use:

EXAMPLE I

The specific formulation for the sealant is:

| | Parts |
|---|---|
| Polyureaurethane Elastomer A | 1170 |
| Dimethylformamide | 2340 |
| Di-n-butylamine | 23 |
| Rubarite powder | 117 |
| Diatomaceous earth | 54 |

The polyureaurethane elastomer A was dissolved by stirring it into a solution of the di-n-butylamine in dimethylformamide at 70–80° C.

This solution had a Brookfield viscosity (#3 rotor) of 2500–3000 cps. @ 25° C.

The Rubarite powder (an unvulcanized free-flowing rubber powder made by coagulating and drying a mixture of diatomaceous earth slurry and a latex of a copolymer of 70% butadiene, 30% styrene to give a powder containing 40% rubber) and the diatomaceous earth were easily dispersed in the polyureaurethane solution with the aid of an ordinary laboratory stirrer.

The above formula will produce one gallon of sealant.

A 7.50–14 nylon 2-ply all weather pneumatic tire which had most of the tread worn away was pierced 26 times with thorns of various sizes. Then the inside liner of the thorn-pierced tire was coated with the sealant composition. Then a pint of the sealant composition was poured into the tire prior to mounting on the wheel and inflating with air to 24 pounds per square inch. The tire mounted on the wheel was put on the test machine and run for 3,603 miles at 30 miles per hour under a load of 1085 pounds without loss of air. Then the tire was pierced twice with a one-sixteenth inch awl near the tread center line and the test restarted. No air was lost and no spider webbing occurred due to excessive loss of polymer solution, by the time the test mileage had reached a total of 4,347 miles.

Any of the polyureaurethanes from Examples B to J may be used instead of polyureaurethane A in the above recipe.

While certain representative embodiments and details have been shown for the purpose of illustrating the invention, it will be apparent to those skilled in this art that various changes and modifications may be made therein without departing from the spirit or scope of the invention.

What is claimed is:

1. A composition of matter having a viscosity of 1000 to 10,000 centipoises at 25° C., consisting essentially of a solvent dispersion of an inert mineral powder in a solution of a solvent and a polyureaurethane elastomer capable of being dissolved by dimethyl formamide to give a solution at about 100° C., said inert mineral powder having a U.S. Standard Screen size less than 100 mesh, said composition containing about .5 to about 10 parts of a mineral powder for each hundred parts of polyureaurethane and about .5 to 10 parts of a powdered rubber for each hundred parts of polyureaurethane, said powdered rubber being a free-flowing admixture of an inert mineral filler with sufficient rubber to give about 20 to 80 percent by weight thereof deposited on the inert mineral filler, said solvent being selected from the group consisting of dimethylsulfide, dimethylformamide, dimethylacetamide and mixtures of dimethylformamide and dimethylacetamide with dimethylsulfoxide.

(References on following page)

References Cited

UNITED STATES PATENTS

| | | | |
|---|---|---|---|
| 2,888,413 | 5/1959 | Pace | 260—75 |
| 2,921,919 | 1/1960 | Endres et al. | 260—28.5 |
| 2,953,539 | 9/1960 | Keplinger et al. | 260—40 |
| 3,016,356 | 1/1962 | Pace | 260—75 |
| 3,025,259 | 3/1962 | Watson et al. | 260—40 |
| 3,048,509 | 8/1962 | Sweet et al. | 260—41.5 |
| 3,054,756 | 9/1962 | Holtschmidt et al. | 260—2.5 |
| 3,097,192 | 7/1963 | Schilit | 260—40 |
| 3,142,652 | 7/1964 | Pace | 260—75 |
| 3,190,338 | 6/1965 | Wolfe | 152—370 |

FOREIGN PATENTS

| | | |
|---|---|---|
| 1,001,897 | 2/1952 | France. |

MORRIS LIEBMAN, *Primary Examiner.*

JULIUS FROME, *Examiner.*

B. A. AMERNICK, *Assistant Examiner.*